United States Patent
Meredith et al.

(10) Patent No.: US 9,046,592 B2
(45) Date of Patent: Jun. 2, 2015

(54) TIMED FINGERPRINT LOCATING AT USER EQUIPMENT

(75) Inventors: Sheldon Kent Meredith, Marietta, GA (US); Mark Austin, Roswell, GA (US); Jeremy Fix, Acworth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 459 days.

(21) Appl. No.: 13/495,391

(22) Filed: Jun. 13, 2012

(65) Prior Publication Data

US 2013/0337824 A1    Dec. 19, 2013

(51) Int. Cl.
| | |
|---|---|
| H04W 24/00 | (2009.01) |
| G01S 5/00 | (2006.01) |
| H04W 64/00 | (2009.01) |
| G01S 5/02 | (2010.01) |

(52) U.S. Cl.
CPC ............. *G01S 5/00* (2013.01); *H04W 64/00* (2013.01); *G01S 5/0252* (2013.01)

(58) Field of Classification Search
USPC ................... 455/456.1–457; 370/338
See application file for complete search history.

(56) References Cited

U.S. PATENT DOCUMENTS

| | | |
|---|---|---|
| 4,718,081 A | 1/1988 | Brenig |
| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |
| 6,125,125 A * | 9/2000 | Narasimha et al. ........... 370/510 |
| 6,148,219 A | 11/2000 | Engelbrecht et al. |

(Continued)

FOREIGN PATENT DOCUMENTS

| | | |
|---|---|---|
| EP | 0856746 A2 | 8/1998 |
| EP | 1145526 | 10/2001 |

(Continued)

OTHER PUBLICATIONS

Final Office Action dated Jan. 25, 2013, for U.S. Appl. No. 13/554,285, 20 pages.

(Continued)

*Primary Examiner* — Marcos Batista
(74) *Attorney, Agent, or Firm* — Amin, Turocy & Watson, LLP

(57) ABSTRACT

Systems and techniques for determining the location of user equipment (UE) in a wireless network are disclosed. These techniques leverage geometric calculations for an overlaid local bin grid framework mapping an area of a wireless network to stored differential values for each frame of the local bin grid framework for pairs of relevant NodeB radios. A timing offset can be determined, such that when a time value from the UE is accessed, the location can be quickly determined with minimal real time computation. In an aspect, the UE time value can be searched for in the pre-computed differential value data set indexed by a relevant NodeB radio pair to return a set of frames that can be intersected with a second set of frames for a second NodeB radio pair for the UE. The intersecting frames can represent the location of the UE in the wireless network.

20 Claims, 10 Drawing Sheets

(56) References Cited

U.S. PATENT DOCUMENTS

| | | |
|---|---|---|
| 6,216,002 B1 | 4/2001 | Holmring |
| 6,230,018 B1 | 5/2001 | Watters et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran et al. |
| 6,330,459 B1 | 12/2001 | Chrichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,405,047 B1 | 6/2002 | Moon |
| 6,407,703 B1 | 6/2002 | Minter et al. |
| 6,429,815 B1 | 8/2002 | Soliman |
| 6,434,396 B1 | 8/2002 | Rune |
| 6,449,486 B1 | 9/2002 | Rao |
| 6,453,168 B1 | 9/2002 | McCrady et al. |
| 6,493,539 B1 | 12/2002 | Falco et al. |
| 6,515,623 B2 | 2/2003 | Johnson |
| 6,522,296 B2 | 2/2003 | Holt |
| 6,526,335 B1 | 2/2003 | Treyz et al. |
| 6,552,682 B1 | 4/2003 | Fan |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,850,761 B2 | 2/2005 | Pallonen |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,058,710 B2 | 6/2006 | McCall et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,420,464 B2 | 9/2008 | Fitzgerald et al. |
| 7,432,829 B2 | 10/2008 | Poltorak |
| 7,436,794 B2 | 10/2008 | Takahashi et al. |
| 7,463,143 B2 | 12/2008 | Forr et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,065,185 B2 | 11/2011 | Foladare et al. |
| 8,098,152 B2 | 1/2012 | Zhang et al. |
| 8,121,604 B1 | 2/2012 | Schwinghammer |
| 8,126,479 B2 | 2/2012 | Morrison |
| 8,140,079 B2 | 3/2012 | Olson |
| 8,193,984 B2 | 6/2012 | Ward et al. |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,326,682 B2 | 12/2012 | Redford et al. |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,548,494 B2 | 10/2013 | Agarwal et al. |
| 8,572,198 B2 | 10/2013 | Jhanji |
| 8,594,700 B2 | 11/2013 | Nabbefeld |
| 8,611,919 B2 | 12/2013 | Barnes |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0125046 A1 | 7/2003 | Riley et al. |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0024639 A1 | 2/2004 | Goldman |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2004/0267561 A1 | 12/2004 | Meshkin et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |

(56) References Cited

U.S. PATENT DOCUMENTS

| | | |
|---|---|---|
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren et al. |
| 2009/0125380 A1 | 5/2009 | Otto et al. |
| 2009/0131073 A1 | 5/2009 | Carlson et al. |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0299788 A1 | 12/2009 | Huber et al. |
| 2009/0310501 A1 | 12/2009 | Catovic et al. |
| 2009/0327134 A1 | 12/2009 | Carlson et al. |
| 2010/0004997 A1 | 1/2010 | Mehta et al. |
| 2010/0020776 A1 | 1/2010 | Youssef et al. |
| 2010/0054237 A1 | 3/2010 | Han et al. |
| 2010/0058442 A1 | 3/2010 | Costa et al. |
| 2010/0081389 A1 | 4/2010 | Lawrow |
| 2010/0094758 A1 | 4/2010 | Chamberlain et al. |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi et al. |
| 2010/0172259 A1 | 7/2010 | Aggarwal et al. |
| 2010/0189236 A1 | 7/2010 | MacDonald |
| 2010/0190509 A1 | 7/2010 | Davis et al. |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0262449 A1 | 10/2010 | Monteforte et al. |
| 2010/0273504 A1 | 10/2010 | Bull et al. |
| 2010/0291907 A1 | 11/2010 | MacNaughtan et al. |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2010/0323723 A1 | 12/2010 | Gerstenberger et al. |
| 2010/0331013 A1 | 12/2010 | Zhang |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Choi-Grogan |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0099047 A1 | 4/2011 | Weiss et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0032855 A1 | 2/2012 | Reede et al. |
| 2012/0052883 A1 | 3/2012 | Austin et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182874 A1 | 7/2012 | Siomina et al. |
| 2012/0185309 A1 | 7/2012 | Kakarla et al. |
| 2012/0287911 A1 | 11/2012 | Takano et al. |
| 2012/0317500 A1 | 12/2012 | Kosseifi et al. |
| 2012/0323703 A1 | 12/2012 | Hillier et al. |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0053057 A1 | 2/2013 | Cansino et al. |
| 2013/0096966 A1 | 4/2013 | Barnes |
| 2013/0137464 A1 | 5/2013 | Kramer et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0122220 A1 | 5/2014 | Bradley et al. |
| 2014/0171060 A1 | 6/2014 | Cook et al. |
| 2014/0278744 A1 | 9/2014 | Lo Faro et al. |

FOREIGN PATENT DOCUMENTS

| | | |
|---|---|---|
| JP | 2004069609 | 3/2004 |
| JP | 2007328050 A | 12/2007 |
| WO | 2006031035 A1 | 3/2006 |

OTHER PUBLICATIONS

Non-Final Office Action dated Mar. 19, 2013, for U.S. Appl. No. 13/174,541, 46 pages.

Final Office Action dated Feb. 13, 2013, for U.S. Appl. No. 13/220,083, 48 pages.

Final Office Action dated Feb. 22, 2013, for U.S. Appl. No. 13/188,345, 45 pages.

Final Office Action dated Mar. 15, 2013, for U.S. Appl. No. 13/204,535, 18 pages.

Non-Final Office Action dated Mar. 19, 2013, for U.S. Appl. No. 13/284,497, 46 pages.

Non-Final Office Action dated Apr. 19, 2013, for U.S. Appl. No. 13/277,595, 58 pages.

Marko Silventoinen, et al., "Mobile Station Locating in GSM" Helsinki, Finland, Last accessed on Nov. 15, 2011, 7 pages.

Office Action dated Dec. 30, 2013 for U.S. Appl. No. 13/305,267, 10 pages.

Office Action dated May 21, 2013 for U.S. Appl. No. 13/305,276, 28 pages.

Office Action dated Oct. 24, 2012 for U.S. Appl. No. 13/305,276, 37 pages.

"Locate your friends in real time with Google Latitude." http://googlemobile.blogspot.com/2009/02/locate-your-friends-in-real-time-with.html. Last accessed Mar. 18, 2012, 23 pages.

"Location sharing and updating." http://support.google.com/mobile/bin/answer.py?hl=en&answer=136647. Last accessed Mar. 8, 2012, 3 pages.

"Privacy Settings." http://support.google.com/mobile/bin/answer.py?hl=en&answer=136650, Last accessed Mar. 18, 2012, 1 page.

Office Action dated Nov. 25, 2013 for U.S. Appl. No. 13/447,069, 40 pages.

Office Action dated May 9, 2013 for U.S. Appl. No. 13/447,069, 33 pages.

Tsai, et al, "Location-Sharing Technologies: Privacy Risks and Controls." Feb. 2010. Retrieved on May 10, 2013, 26 pages.

(56) References Cited

OTHER PUBLICATIONS

Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 (Sep. 2005) Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN lu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.
Office Action dated Mar. 25, 2014 for U.S. Appl. No. 13/488,144, 60 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Office Action dated Sep. 20, 2012 for U.S. Appl. No. 12/870,254, 29 pages.
Office Action dated May 14, 2014 for U.S. Appl. No. 13/660,689, 62 pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved on May 9, 2014 from http://search.credoreference.com/content/entry/hcengdict/represent/0, 2 pages.
Represent. (2001). In Chambers 21 st century dictionary. Retrieved on May 9, 2014 from http://search.credoreference.com/content/entry/chambdict/represent/O.
Represent. (2011). In the american heritage dictionary of the english language. Retrieved May 9, 2014 from http://search.credoreference.com/content/entry/hmdictenglang/represent/0.
Non-Final Office Action dated May 20, 2014 for U.S. App. No. 13/551,369, 29 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Non-Final Office Action dated Jun. 6, 2014 for U.S. Appl. No. 13/447,072, 25 pages.
Final Office Action dated Apr. 3, 2014 for U.S. Appl. No. 13/188,295, 37 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map).
Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.

(56) References Cited

OTHER PUBLICATIONS

Office Action dated Nov. 5, 2013 for U.S. Appl. No. 13/188,345, 30 pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
3rd Generation Partnership Project, Technical Specification, "Group Radio Access Network, UTRAN luh interface Node B Application Part (NBAP) signalling (Release 8)", 3GPP TS 25.469 V8.0.0 (Dec. 2008), last viewed Jul. 1, 2009, 56 pages.
Sullivan, Mark. "Signs and Wonders: Is At&T Stepping Up Its Game?" PC World, Dec. 10, 2009, 1 page.
ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.
ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
New Devices Aim to Disable Cell Phones While Driving. FOXNews.com, Jan. 18, 2009. http://www.foxnews.com/printe_friendly_story/0,3566,480585,00.html. Last accessed Nov. 24, 2010, 2 pages.
Cortes, et al. "Support-Vector Networks", Machine Learning, 20, 1995. http://www.springerlink.com/content/k238jx04hm87j80g/fulltext.pdf. Last accessed Dec. 24, 2010, 25 pages.
ACM Website, Press release of Mar. 17, 2009. http://www.acm.org/press-room/news-releases/pdfs/awards-08-groupa1.pdf. Last accessed Dec. 24, 2010, 3 pages.
"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary? doi=10.1.1.21.3818. Last accessed Dec. 24, 2010, 9 pages."
"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages."
"Drucker, et al. Support Vector Regression Machines.http://scholar.google.com/scholar?q=%22Support+Vector+Regression+Machines.%22. Last accessed Dec. 24, 2010, 7 pages.".
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
International Search Report for PCT Application No. US2011/026122 Sep. 10, 2011, 11 pages.
International Search Report for PCT Application No. US2011/026120 dated Sep. 9, 2011 13 pages.
Charitanetra et al. "Mobile positioning location using E-OTD method for GSM network" Research and Development, 2003. Proceedings Student Conference on Putrajaya, Malaysia Aug. 25-26, 2003, pp. 319-324.
"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-. . . 1&ct=clnk, Oct. 12, 2010.
"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages. Aug. 15, 2011.
Koukoumidis Emmanouil, Peh Li-Shiuan, Martonosi Margaret, SignalGuru: Leveraging Mobile Phones for Collaborative Traffic Signal Schedule Advisory. 14 pages. Jun. 28, 2011.
Bitcarrier Technology. Published online at http://www.bitcarrier.com/technology. 1 page. Aug. 15, 2011.
Ban Xuegang(Jeff). Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
OA dated Apr. 13, 2012 for U.S. Appl. No. 12/416,853, 36 pages.
Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 15, 2014 for U.S. Appl. No. 13/219,911, 38 pages.
Final Office Action dated Jan. 28, 2014 for U.S. Appl. No. 12/958,146, 24 pages.
Notice of Allowance dated Feb. 14, 2014 for U.S. Appl. No. 13/284,456, 30 pages.
Final Office Action dated Feb. 24, 2014, for U.S. Appl. No. 13/927,020, 18 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Office Action dated Nov. 14, 2014 for U.S. Appl. No. 13/277,595, 74 pages.
Notice of Allowance dated Nov. 20, 2014 for U.S. Appl. No. 13/866,909, 27 pages.
Notice of Allowance dated Dec. 9, 2014 for U.S. Appl. No. 12/958,146, 48 pages.
Office Action dated Dec. 11, 2014 for U.S. Appl. No. 13/447,072, 28 pages.
Office Action dated Dec. 1, 2014 for U.S. Appl. No. 13/495,756, 76 pages.
Office Action dated Jan. 7, 2015 for U.S. Appl. No. 13/557,425, 30 pages.
Girardin, et al., "Digital footprinting: Uncovering tourists with user generated content." Pervasive Computing, IEEE 7.4, Oct.-Nov. 2008. 8 pages.

(56) References Cited

OTHER PUBLICATIONS

Steinfield, "The development of location based services in mobile commerce." ELife after the Dot Com Bust. PhysicaVerlagHD, 2004. 15 pages.

Sevtsuk, et al., "Does urban mobility have a daily routine? Learning from the aggregate data of mobile networks." Journal of Urban Technology, vol. 17, No. 1, Apr. 2010: 20 pages.

Buhalis, et al., "Information communication technology revolutionizing tourism." Tourism Recreation Research, vol. 30, No. 3, 2005. 10 pages.

Ratti, et al. "Mobile Landscapes: using location data from cell phones for urban analysis." Environment and Planning B: Planning and Design, vol. 33, 2006, 23 pages.

Office Action dated Feb. 13, 2015 for U.S. Appl. No. 13/188,136, 44 pages.

Notice of Allowance mailed Feb. 6, 2015 for U.S. Appl. No. 13/204,535, 20 pages.

Office Action dated Feb. 13, 2015 for U.S. Appl. No. 14/516,286, 62 pages.

Hao, et al., "Estimating Vehicle Position in a Queue at Signalized Intersections Using Simple Travel Times from Mobile Sensors." Retrieved on Nov. 19, 2011, 6 pages.

\* cited by examiner

TIMED FINGERPRINT LOCATING AT USER EQUIPMENT

TECHNICAL FIELD

The subject disclosure relates to wireless communications and, more particularly, to location determination(s) at mobile equipment of a wireless network environment.

BACKGROUND

In mobile equipment networks, locating user equipments (UEs) can provide valuable additional benefits to users and opportunities for additional or improved services. Locating UEs in a wireless network can facilitate providing location-centric services or information in relation to the UE, such as E911 services, mapping services, or traffic information services, among many others. Additionally, UE location information can be employed to improve network performance, to troubleshoot networks, by law enforcement, to aggregate valuable demographic information, or nearly a limitless number of other uses. Network timing delays can include site timing delay in the wireless signal path among radio component(s) at the wireless base station and a sector antenna. Network timing delays further include delays that can arise from various mismatches (e.g., impedance mismatch) among electronic elements and components, stray capacitances and inductances, length of the antenna(s) cable(s) in base station(s); tower height of base station, signal path scattering, or "signal bounces," such as multipath or strong reflections, and the like. Propagation delay between a UE and a radio, e.g., a radio of a NodeB, is conventionally assumed to be negligible with respect to timing delay. However, signal propagation delay can be non-negligible, particularly in distributed antenna systems and low-power wireless radio cells and cause error in UE location determinations for traditional methods.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a mobile device can include a processor and memory. The processor can facilitate the execution of computer-executable instructions stored on the memory. The processor can facilitate execution of the computer-executable instructions to determine differential time value information for at least one frame of a bin grid frame array. The determination of the differential time value information can be based on cell site delay information. Further, the processor can facilitate execution of the computer-executable instructions to store the determined differential time value information in the memory of the mobile device. The stored differential time value information can be used to facilitate queries based on observed time value information associated with the mobile device.

In another embodiment, a method can include determining, by a system including at least one processor, differential time value information for at least one frame of a bin grid frame array. The differential time value information can be based on cell site delay information. The method can further include storing, in a memory of a mobile device, the differential time value information to facilitate queries of the differential time value information based on observed time value information associated with the mobile device.

In a further embodiment, a non-transitory computer-readable storage medium storing computer-executable instructions that, in response to execution, cause a system including a processor to perform operations, including determining differential time value information for at least one frame of a bin grid frame array based on cell site delay information. The non-transitory computer-readable storage medium can further cause a system to perform operations, including storing, in a memory of a mobile device, the differential time value information to facilitate a query of the differential time value information based on observed time value information associated with the mobile device.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the drawings.

DETAILED DESCRIPTION

Figure 1:
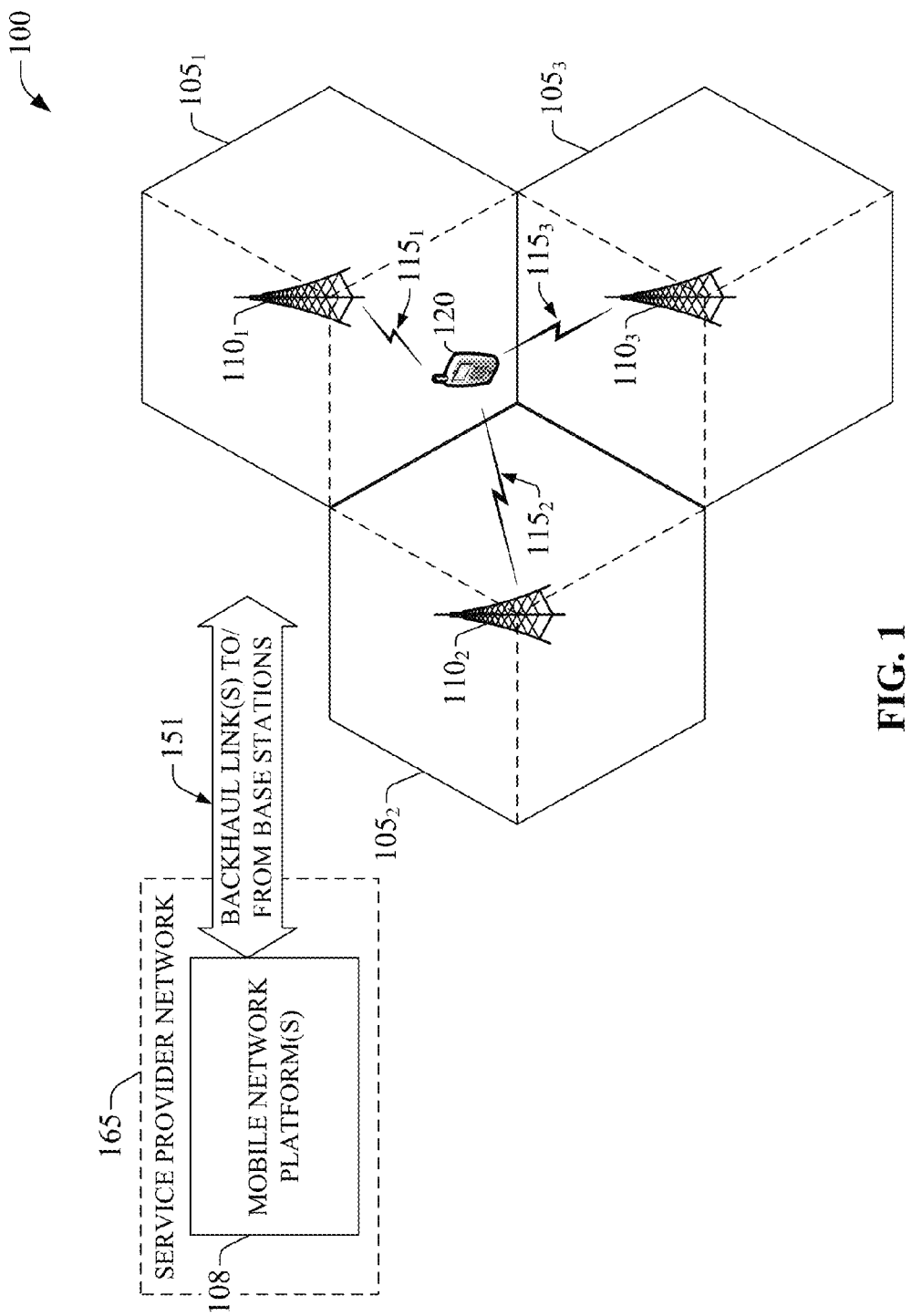
FIG. 1 illustrates a schematic of an exemplary wireless environment that can operate in accordance with aspects of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIG. 1 is a schematic of an exemplary wireless environment 100 that can operate in accordance with aspects of the disclosed subject matter described herein. In particular, exemplary wireless environment 100 illustrates a set of wireless network macro cells. Three coverage macro cells $105_1$-$105_3$ comprise the illustrative wireless environment; however, it should be appreciated that wireless cellular network deployments can encompass any number of macro cells, for example, $10^4$-$10^5$ coverage macro cells. Coverage macro cells $105_\lambda$ ($\lambda$=1,2,3) are illustrated as hexagons; however, coverage cells can adopt other geometries generally dictated by a deployment configuration or floor plan, geographic areas to be covered, and so on. Each macro cell $105_\lambda$ is sectorized in a 2 $\pi$/3 configuration in which each macro cells includes three sectors, demarcated with dashed lines in FIG. 1. It will be noted that other sectorizations are possible, and aspects or features of the disclosed subject matter can be exploited regardless of type of sectorization. Macro cells $105_1$, $105_2$, and $105_3$ are served respectively through radios associated with NodeB $110_1$, $110_2$ and $110_3$. Any two radios of NodeBs can be considered a NodeB site pair (NBSP or radio pair) It is noted that radio component(s) are functionally coupled through links such as cables (e.g., RF and microwave coaxial lines), ports, switches, connectors, and the like, to a set of one or more antennas that transmit and receive wireless signals (not illustrated). It is noted that a radio network controller (not shown), which can be a part of mobile network platform(s) 108, and set of base stations (e.g., Node B $110_n$, with n=1,2, . . . ) that serve a set of macro cells; electronic circuitry or components associated with the base stations in the set of base stations; a set of respective wireless links (e.g., links $115_k$ where k=1,2, . . . ) operated in accordance to a radio technology through the base stations, form a macro radio access network (RAN). It is further noted, that based on network features, the radio controller can be distributed among the set of base stations or associated radio equipment. In an aspect, for UMTS-based networks, wireless links $115_\lambda$ embody a Uu interface (UMTS Air Interface).

Mobile network platform(s) 108 facilitates circuit switched (CS)-based (e.g., voice and data) and packet-switched (PS) (e.g., internet protocol (IP), frame relay, or asynchronous transfer mode (ATM)) traffic and signaling generation, as well as delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include any EM frequency bands licensed by the service provider (e.g., personal communication services (PCS), advanced wireless services (AWS), general wireless communications service (GWCS), and so forth), and any unlicensed frequency bands currently available for telecommunication (e.g., the 2.4 GHz industrial, medical and scientific (IMS) band or one or more of the 5 GHz set of bands). In addition, wireless network platform(s) 108 can control and manage base stations $110_\lambda$, and radio component(s) associated thereof, in disparate macro cells $105_\lambda$ by way of, for example, a wireless network management component (e.g., radio network controller(s), cellular gateway node(s), etc.) Moreover, wireless network platform(s) can integrate disparate networks (e.g., femto network(s), Wi-Fi network(s), femto cell network(s), broadband network(s), service network(s), enterprise network(s), . . . ) In cellular wireless technologies (e.g., 3rd Generation Partnership Project (3GPP) Universal Mobile Telecommunication System (UMTS), Global System for Mobile Communication (GSM), Long Term Evolution (LTE), etc.), wireless network platform 108 is embodied in a core network and a set of radio network controllers.

In addition, wireless backhaul link(s) 151 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 151 embodies IuB interface.

It should be appreciated that while exemplary wireless environment 100 is illustrated for macro cells and macro base stations, aspects, features and advantages of the disclosed subject matter can be implemented in microcells, picocells, femto cells, or the like, wherein base stations are embodied in home-based access points.

Timing of wireless signals must take into consideration the time from wave signal generation or output at radio equipment a transmitter (e.g., a UE or radio of a NodeB) to detection at a receiver (e.g., a UE or radio of a NodeB). Such timing includes site timing through link(s) to antenna(s) and propagation time over the air interface or wireless channel. Timing delay typically is caused by various source, e.g., mismatches among electronic elements and components (e.g., impedance mismatch), stray capacitances and inductances, length of the antenna(s) cable(s) in base station(s); tower height of base station, whereas timing delay spread generally originates from any signal path scattering, or "signal bounces," such as multipath, strong reflections, etc.; and the like. In an aspect of the disclosed subject matter, timing and delay errors can be compensated for where the errors in delay and timing can be determined. Wherein better location measurements beget better timing measurements, aspects of the disclosed subject matter can, at least in part, contribute to improved network performance. Similarly, better timing measurements can be employed for better location determination. Further, it is noted that compensation of timing delay can depend on sector coverage, e.g., a first sector can be densely populated while a neighboring sector can include substantial areas of lower population density.

A UE observed time difference, 'C', includes both a cell site timing portion, 'A', and a RF propagation portion, 'B', such that A+B=C. Further, where cell site location and UE location are known, the RF propagation time, B, can be deduced, e.g., B=(distance between UE and cell site/speed of light). Using the deduced RF propagation time, B, and Observed UE time difference, C, the cell site timing, A, can be calculated, as A=C−B. Site timing, A, is relatively stable over periods of hours to days for most modern network equipment. Once A is determined, C can be measured for additional UEs and the RF propagation time (i.e., B) for theses additional UEs can be determined by B=C−A. RF propagation time, B, can then be converted into a distance (e.g., B*speed of light=distance) and, using multilateration techniques, UEs positions can be identified.

Determining the values of B by geometry can be facilitated by having a knowledge of the location the NodeB and UE. NodeB locations are typically known with high levels of precision, as these are normally permanent installations. Further, the location of a particular UE can be determined using internal global positioning system (GPS) systems (e.g., assisted GPS (AGPS), usually to within 5-10 meter accuracy). Thus an AGPS enabled UE can facilitate the determination of A, as disclosed herein, such that the location of non-location aware UEs in a macro cell can be calculated, for example, by multilateration. In experiments, these measurements can produce location accuracies for non-location aware UEs with median errors of <70 m in suburban areas. Multilateration incorporates compounding errors. Further, multilateration is also computationally significant (e.g., involves hyperbolic functions between NBSPs at (N−1)!, where N is the number of cell sites, for example, 5 cell sites would involve 24 simultaneous hyperbolic functions.) Timed fingerprint locating (TFL), as disclosed herein, can reduce computational complexity and provide pre-computed values in lookup tables to facilitate improved location techniques.

Figure 2:
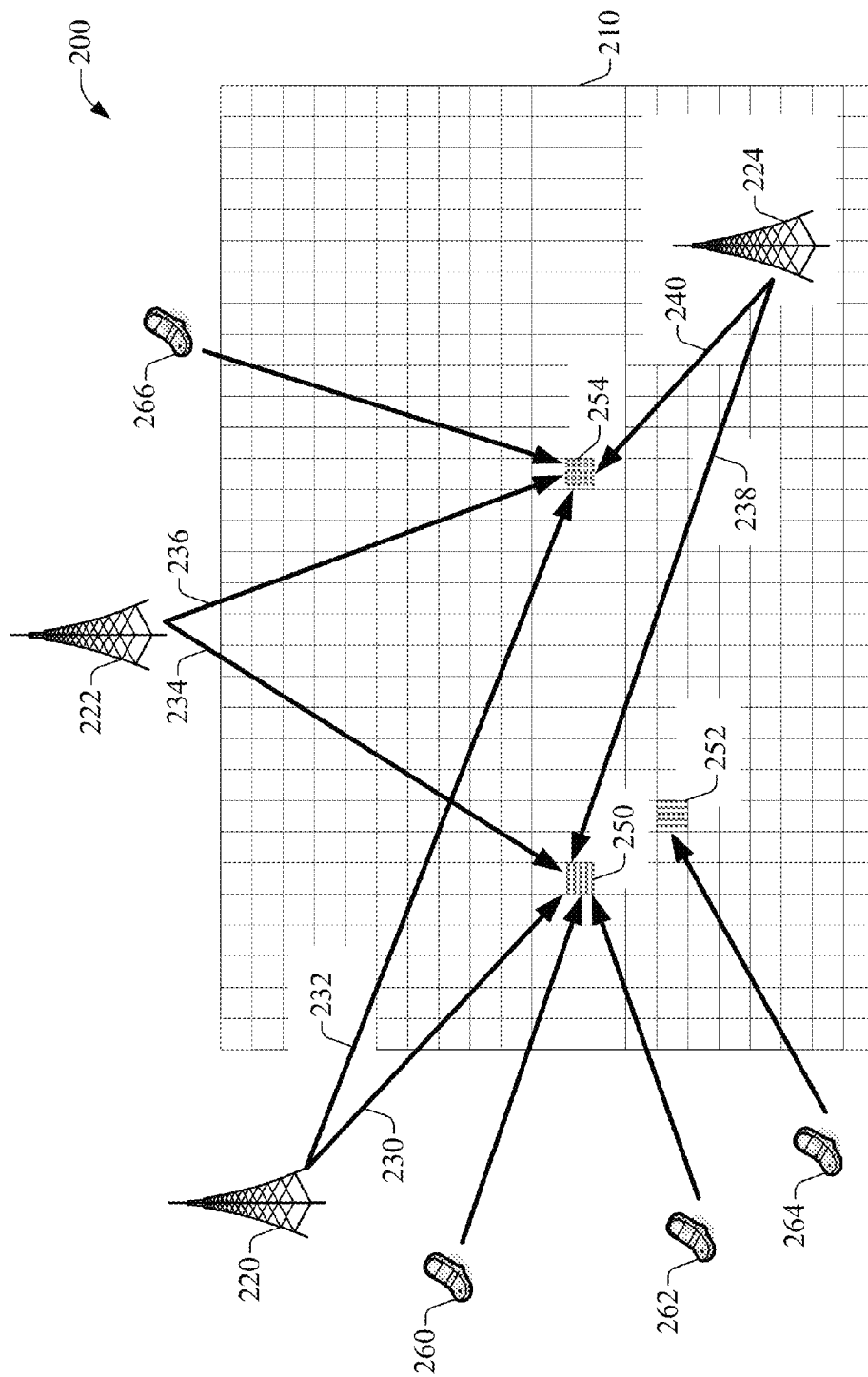
FIG. 2 is a diagram of a subset of wireless devices (UEs) in a time fingerprint location wireless environment in accordance with aspects of the disclosed subject matter.

FIG. 2 is a diagram of a subset of wireless devices (e.g., UEs) in a timed fingerprint location (TFL) wireless environment 200, in accordance with aspects of the disclosed subject matter. TFL wireless environment 200 includes a bin grid 210 that is a relative coordinate framework which defines a matrix of evenly spaced points referred to interchangeably as bins or frames. The frames can be correlated to a geographic data set, e.g., the bin grid 210 can provide identifiable regions of a predetermined area related to a mapping of a cell site, radios of NodeBs, county, county, etc. It can generally be stated that any UE is in one bin grid 210 frame at a given time.

Bin grid 210 frames are of arbitrary size and number. As such, all levels of frame granularity with regard to TFL techniques are considered within the scope of the present disclosure. However, for simplicity, bin grid 210 (and also 310) frame size will be considered to be 100 meters by 100 meters for the purposes of discussion herein, as this closely matches current UMTS chip size (e.g., UMTS chip rate is 3.84 MBit/sec, therefore one chip is roughly 260.42 nsec and 78 meters). Additionally, a bin grid can comprise other bin grids or portions thereof. Moreover, bin grids may overlap wholly or partially and at any orientation. For simplicity, only single bin grids are discussed herein, but all permutations are considered within the scope of the present disclosure. It is further noted that a bin grid can be physically two dimensional (2D) or three dimensional (3D), wherein a 2D grid can, for example, include x,y coordinates (e.g., latitude, longitude) and a 3D grid can add, for example, a z dimension (e.g., height). For simplicity, only 2D bin grids are discussed herein, although both 2D and 3D bin grids are considered within the scope of this disclosure. Moreover, abstract dimensions can be considered, such as, for example, time, network type, subscriber level, etc. All such additional abstract dimensions are within the scope of the subject disclosure. For simplicity, these additional abstract dimensions will not be further discussed.

TFL wireless environment 200 can further include one or more NodeB cell base sites 220, 222, 224. These NodeB are typically fixed locations with well-characterized location coordinates such that the distance between a NodeB, including the radios of the NodeB, and any given frame of bin grid 210 can be easily computed. In FIG. 2, distances 230 and 232 correlate to measurements between NodeB 220 and frames 250 and 254 respectively. It will be noted that the term NodeB, as used herein can be used interchangeably to indicate the NodeB installation itself and/or the radios comprising the NodeB given that these radios are typically highly localized to the position of the NodeB itself. Thus, distances 234 and 236 correlate to measurements between NodeB 222, including the radios of NodeB 222, and frames 250 and 254 respectively. Likewise, distances 238 and 240 correlate to measurements between NodeB 224 and frames 250 and 254 respectively. Given that the distances from any NodeB to any frame in bin grid 210 can be accurately calculated, the differential distance of any frame to any two NodeB can also be accurately determined. Similarly, the distance between any two frames of bin grid 210 is readily calculated.

Additionally, TFL wireless environment 200 can include one or more UEs (e.g., mobile phones 260, 262, 264 and 266). These UEs can include location aware UEs (e.g., GPS or AGPS enabled UEs, etc.) and non-location aware UEs. Wireless interactions with UEs can be correlated to nodes in bin grid 210. For example, an AGPS enabled UE can determine a latitude and longitude that can be correlated with a bin grid 210 node encompassing that same latitude and longitude.

Where UE 260 is a location aware UE (e.g., UE 260 is AGPS enabled), UE 260 can make location information available to the TFL wireless environment 200, for example, through one or more radios of a NodeB (e.g., 220, 222, 224). UE 260, for instance, can be located at a latitude and longitude within frame 250 of bin grid 210 and, for example, can transmit this latitude and longitude location information, which can be received, for example, at NodeB 220. This latitude and longitude location information can be directly correlated to frame 250 and also with the RF propagation delay, B, to frame 250 from some radio of a NodeB in TFL wireless environment 200. For example, where UE 260 is located in frame 250, propagation delay 'B' is the distance 230 between a radio of NodeB 220 and UE 260 (located in frame 250) divided by the speed of light. Thus, the propagation delay 'B' can be directly determined because the location of both the NodeB and the UE are known, as disclosed herein. Further, NodeB 220 can communicate this location information, propagation delay information, or derivatives thereof, to other equipment associated with the wireless network.

Given that the propagation delay, B, can be determined for location aware UEs within TFL wireless environment 200, cell site delay, 'A', can be determined where the observed UE time difference, C, is also available. Continuing the present example, UE 260 can make time data (e.g., an observed UE time difference, 'C') accessible to the TFL wireless environment 200. Cell site delay ('A') can be calculated by subtracting the propagation delay ('B') from the observed UE time difference ('C'), (e.g., A=C−B). As discussed herein, A is generally stable over periods of hours to days. Assuming A is relatively stable, B can be determined for some C value (e.g., B=C−A). Most or all UEs (e.g., both location enabled and non-location enabled UEs) can make time data (e.g., an observed UE time difference, 'C') available to the TFL wireless environment 200, for example by transmitting it wirelessly, such that the propagation delay for most or all UEs can be determined with a simple calculation, given the determined A value. Further, given that the propagation delay, B, is essentially proportional to distance (e.g., B*speed of light=distance), the propagation delay can be employed to map out a region of probable locations for a UE at a set distance from the related NodeB (e.g., the NodeB from which the propagation delay was measured). This can provide a centroid region in which the UE would likely be located, as disclosed in as disclosed in U.S. patent application Ser. No. 12/712,424.

It is well understood that errors can be associated with the various measurements involved in the disclosed calculations, for example, AGPS measurements are only accurate to about 5-10 meters, an AGPS measurement can be taken from various positions with a single 100 m×100 m bin grid frame, signals can be bounced, etc.) These errors can be addressed by well-known statistical methods for sufficiently large sets of location data. In an aspect of the disclosed subject matter, a frame of bin grid 210 can be selected as a reference frame and measurements within that frame can be statistically manipulated to improve the value of the data gathered. For example, where UE 260 and UE 262 are both location aware UEs located within from 250, the AGPS and time data from both UEs (260 and 262) can be statistically combined and manipulated to increase the relevance of the collected data and the resulting calculated values. Moreover, measurements taken from other frames can be translated to the reference frame to facilitate an increased population of location data to improve statistical data correction processes. This translation can be accomplished because knowledge of the spatial relationship between the measured frame and reference frame is known. For example, UE 264 can transmit AGPS location and time data from frame 252. This information can be accessed by a NodeB of TFL wireless environment 200. The data can be manipulated to translate the measured data from frame 252 into the expected values for UE 264 in frame 250. This can allow the AGPS location and time data, collected in various frames of bin grid 210 from location aware UEs, to be correlated to a relevant reference frame. This information can then be statistically adapted to provide improved data for use in calculating locations for non-location aware UEs. The equations for translation among frames will be further disclosed herein.

Differential measurements can be computed for one or more frames of bin grid 210 for any plurality (e.g., pair) of NodeB radios within TFL wireless environment 200. For ease of understanding, bin grid 200 can comprise a large plurality of frames that are each uniquely identified allowing a single frame to be referenced by a "frame number". Alternative frame identification schemes are just as easily applied to identification of individual frames, e.g., row/column numbering, region/subregion/sector, etc., and all such schemes are considered within the scope of the present disclosure, however, such alternatives will not herein be further discussed. Similarly, each NodeB in a wireless system can be identified uniquely by a plurality of conventions, all of which are within the scope of the present disclosure, however only a "lettered" index is herein discussed, e.g., site j, site i, site k, etc. Where each NodeB radio is uniquely identifiable, each pair of radio sites, e.g., a radio pair, is also uniquely identifiable, e.g., pair ij, pair ik, pair jk, pair ji, pair ki, pair kj, etc. Further, NBSPs and frames can be identified parenthetically as "(NBSP, frame)", wherein a question mark, '?', can be used to indicate an arbitrary value, e.g., (ij,250) is the 250 frame in relation to NBSP "ij", while (ij,?) is some undefined frame related to NBSP "ij", (?,250) refers to frame 250 in relation to an undefined NBSP, and similarly (?,?) refers to an arbitrary NBSP and arbitrary frame.

For each radio pair of NodeBs, each frame of a subset of relevant frames associated with the NBSP can have a value assigned that corresponds to that frame's differential value. A subset can comprise some frames, all frames, or no frames (e.g., an empty set). A differential value is a geometrically determined value related to the "distance" of a frame from a NBSP, measured in chip (e.g., "distance" can be a temporal or physical distance.) For known geometries, differential values can be pre-computed for frames.

The NBSPs of TFL wireless environment 200 can each have a reference frame (?,R), for example, (ij,R), (jk,R), (ik,R), etc. An observed time difference, OV(?,?), can be related to the "C" value reported by a location aware UE of system 200. In an aspect, an OV(?,R) value can be directly obtained by data from location aware UEs at a reference frame, R (e.g., UE 260 or UE 262 at reference frame 250 of TFL wireless environment 200.) In another aspect, where an OV(?,X) value from a location aware UE is reported from an instant frame, X, other than the reference frame, R, the value can be translated to a reference frame value based, at least in part, on known differential propagation delays according to:

$$OV(ji,R)=OV(ji,X)+DV(ij,R)-DV(ij,X), \quad\quad \text{Eq. (1)}$$

where

X identifies an instant frame, R identifies a reference frame, ij identifies a NBSP, ji identifies a NBSP, DV(ij,R) is a differential value for the reference frame of the NBSP ij that can be determined from the ij NBSP and reference frame geometry, DV(ij,X) is a differential value for frame X for NBSP ij that can be determined from the ij NBSP and frame X geometry, and OV(ji,X) is an observed value for an frame X of the ji NBSP, such that OV(ji,R) can be calculated. Moreover, OV(?,?) values can be weighted, for example, if a reporting UE is known to be moving at a high rate of speed, the OV(?,?) can be of less relevance and therefore can be given a lower weight. These weighted values can be statistically manipulated to provide a more relevant value for OV(?,R), for example, by reducing measurement error effects.

Whereas DV(ij,R) is the geometrically determined differential value for the reference frame of the ij NBSP, and having previously determined the observed time difference value for the reference frame of the ji NBSP as OV(ji,R), Eq. 1 can be manipulated to determine the expected observed time difference values for any instant frame, X, by simply determining the differential value for any instant frame, X, of the ji NBSP, DV(ji,X), and computing:

$$OV(ji,X)=OV(ji,R)+DV(ij,X)-DV(ij,R). \quad\quad \text{Eq. (2)}$$

This equation can be similarly employed for other known NBSPs as well. In an aspect, this allows an indexed mapping of expected OV(?,?) value(s) for frame(s) of NBSP(s) given a known geometry for the NBSPs and bin grid, and an OV(?,R) reference cell value (e.g., ascertained from location and time data from one or more location enabled UEs associated with a NBSP.)

Figure 3:
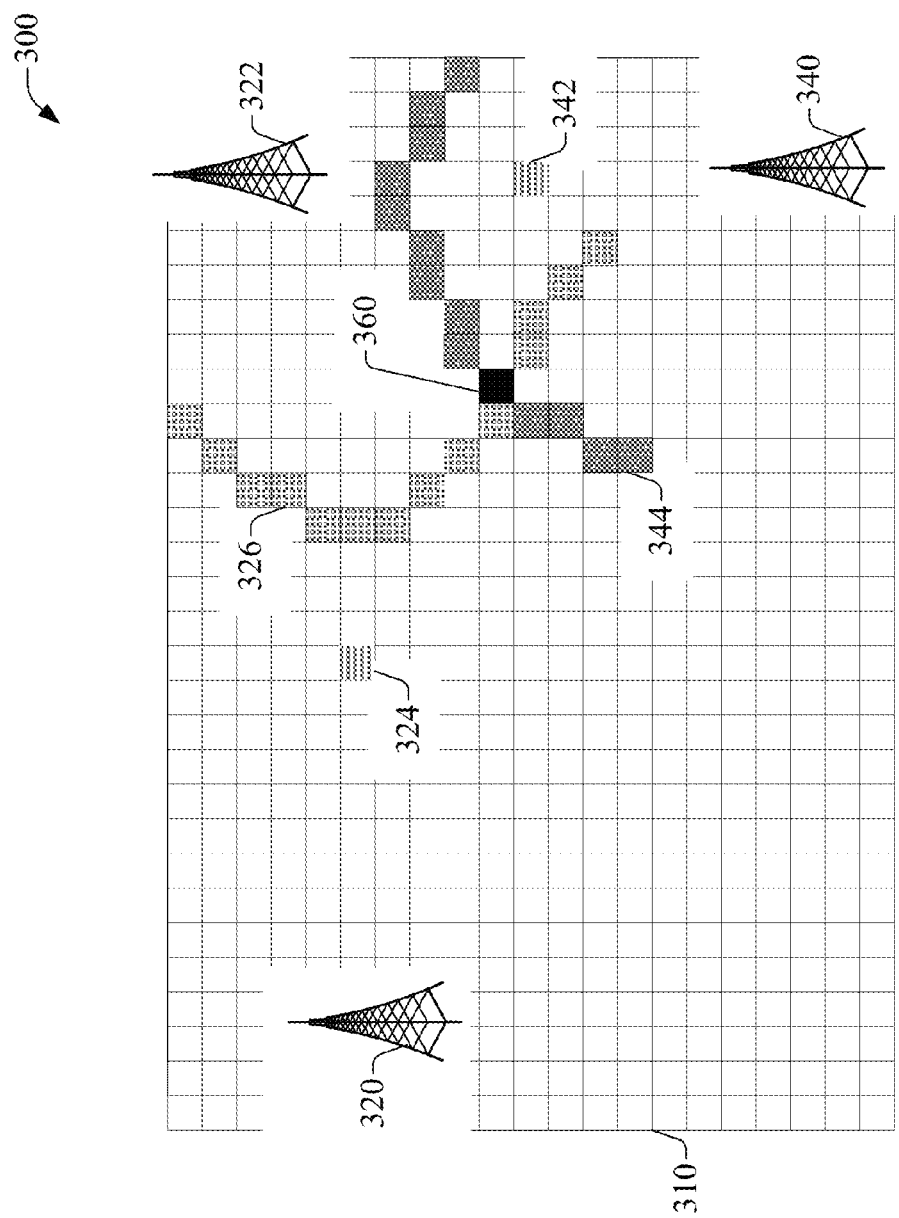
FIG. 3 is a diagram illustrating differential propagation delay sets for radio pairs in a time fingerprint location wireless environment in accordance with aspects described herein.

FIG. 3 illustrates differential propagation delay sets for radio pairs in a time fingerprint location wireless environment 300 in accordance with aspects of the subject disclosure. TFL wireless environment 300 can be referenced to a bin grid 310 and comprise one or more NodeB radios (e.g., 320, 322, 340). As disclosed herein, the differential values, DV(?,X), can be geometrically determined, and mapped to each frame for every known NBSP. In an aspect, this DV(?,?) mapping can be in the form of a table or set of tables to facilitate rapid access to the data. Further, in a NBSP, for example ij, where an OV(ji,X) value is ascertained and OV(ji,R) is known, a corresponding DV(ij,X) value can be generated by:

$$DV(ij,X)=OV(ji,X)-OV(ji,R)+DV(ij,R), \quad\quad \text{Eq. (3)}$$

which is obtained by simple manipulation of Eq. 2. This calculated value of DV(ij,X) can function as a lookup value into the tabulated DV(?,X) data set(s), e.g., "return frames for NBSP ij having a DV(ij,X) value equivalent to the computed value from Eq. 3." The returned values generally will form a hyperbola for the NBSP when overlaid on a geographic map of the sites and bin grid framework. For the exemplary ij NBSP, the returned set can be referred to as the "ij primary set" and can be represented by the set of shaded frames 326 between sites 320 and 322, with corresponding ij NBSP reference frame 324.

In an aspect, UEs can be in an environment with a plurality of available NBSPs, for example, a UE located in frame 360 can be exposed to NBSPs 320/322, 320/340, and 322/340. NBSPs can return a related primary set. Prioritization of NBSPs can be beneficial by returning a primary set for the most relevant NBSP. In accordance with an aspect of the disclosed subject matter, a NBSP can be prioritized based, at least in part, on received signal code power (RSCP) which denotes the power measured by a receiver on a particular physical communication channel of the wireless network 300. For example, the FIG. 3 the NodeB RSCP values can be highest for 322, moderate for 340, and lowest for 320. Continuing this non-limiting example, the ordering of the NodeBs by RSCP can result in looking up primary sets from pair 322/340 first, then 322/320 second, and 340/320 last. It will be appreciated by one of skill in the art that other factors and criteria can be employed in determining what NBSPs are employed for primary pair lookups, for example, confidence scores for data sets, computational load aspects, number of requests in queue, cached primary sets, etc. It will further be appreciated that these numerous other factors and criteria are all within the scope of the present disclosure. As an additional non-limiting example, where NodeB 320 has recently come online and has a relatively newer data set as compared to 322 and 340, there may be a lower confidence in using those values and priority can be given to other NBSPs for lookup.

In an aspect, determining a DV(?,X) can be related to calculating a location for a UE time data ("C") accessed for a non-location enabled UE without the mathematical complexity of hyperbola multilateration. As disclosed herein, where "A" is relatively stable over hours or days, and "C" is accessed for a UE, the "B" value can be calculated and is related to the DV (in units of chip) from any pair of NodeBs. When UE time data is accessed, a DV(?,X) look-up can be initiated. Relevant NBSPs can be prioritized as part of the look-up, for example, by RSCP, etc. Further, the relevant pairs can be employed as an index to lookup a first primary set. As an example, in FIG. 3, time data for a UE (not illustrated) can be accessed in relation to a locating event in TFL wireless environment 300. In this example, it can be determined that NBSP 322/340, with reference frame 342, be used for primary set lookup with the computed DV(?,X) value as the index. This can for example return the shaded frames 344 forming a hyperbola between NodeB 322 and NodeB 340 where DV(?,X)=DV(322/340,X). This indicates that the UE is most likely located at one of the shaded frames of set 344. A second lookup can then be performed for an additional relevant NBSP, for example, NBSP 320/322, with reference frame 324, using the same value DV(?,X), as an index into the data set. Continuing the example, the returned set for the look up with DV(320/322,X)=DV(?,X) can return the set of shaded frames 326. Thus, the UE is also most likely located in the shaded frames designated by set 326. Therefore, where the UE is most likely in both set 344 and set 326, it is clear that the most probable location for the UE is at the intersection of the two sets, at frame 360.

It will be appreciated that additional lookups can be undertaken in an attempt to isolate the most likely frame by intersections of returned sets and that this aspect is within the scope of the current disclosure. In a further aspect, where no exact match is found, frames within a predetermined distance of the closest match can be retained as eligible, for example, frames within 5 chips of the closest match. In another aspect, more or less granular data sets can be employed to give more refined location results, for example, a more coarse granularity can be employed so that a match can be obtained even where the location footprint area is larger. As a second example, a finer granularity can be employed to better determine the location of a UE (e.g., a smaller footprint area) where such a data set is available and an exact match frame results. In some instances no single frame can be resolved (e.g., insufficient data, too few NodeBs, etc.)

Moreover, the DV(?,X) values can be computed on individual mobile devices, e.g., UEs, in TFL wireless environment 300. As such, the computation of DV(?,X) values can be shifted from a centralized processing scheme to a distributed individual computation scheme. The distributed individual computation scheme can be associated with smaller sets of computed DV(?,X) values, namely those relevant to the UE itself rather than to computation of larger sets of DV(?,X) values associated with larger sections of, or all of, the wireless network. The computation of DV(?,X) values at individual UEs can be by the same process as used to compute DV(?,X) values as disclosed herein and in as disclosed in U.S. patent application Ser. No. 12/712,424, except for set of bin grid frames relevant to the UE itself. As an example, a UE can be associated with a bin grid array encompassing a geographic region inclusive of some or all of the NodeB radios with which the UE currently has radio contact. Continuing the example, the UE can then compute DV(?,X) values associated with the bins of the exemplary bin grid array.

Computation of the DV(?,X) values can be based on a "C" value as disclosed herein and also in U.S. patent application Ser. No. 12/712,424. In an aspect, the individual UE computation of DV(?,X) values can be based on the UEs receiving radio delay calibration information, e.g., "C" values for relevant NodeB radios. This calibration information can be determined in a TFL environment but can be employed both in a wide network TFL purpose as well as in an individual UE TFL purpose. As such, where the NBSPs are calibrated, the calibration information can be employed in TFL location determination and can also be transmitted as calibration data back out over a wireless network to UEs to facilitate local determination of DV(?,X) values. Where DV(?,X) values are determined for individual UEs, these UEs can then also determine location based on observed time measurements, e.g., OV(ji,X), by way of Eq. 2.

In an aspect, individual UE determination of DV(?,X) values and location by local lookup of OV(ji,X) values, can provide TFL-type information with computations local to the UE based on received calibration data. The calibration data, e.g., the "C" information, can be determined on carrier-side TFL systems and made available to UE of a TFL environment. The calibration information can be included in conventional overhead signaling channels of a wireless network. As such, the calibration information can be updated on UEs as part of regular radio traffic between a network and a UE. This can be beneficial in that the UE will experience a nominal difference in power consumption to receive the calibration information and to compute DV(?,X) values, in comparison to using AGPS systems. Individual UE determination of location can, in fact, even consume less power than requesting location information by way of carrier-side TFL systems that would employ a UE radio to transmit and/or receive TFL-locate message(s). Experimental results indicate, in some embodiments of individual UE determination of TFL-type information, around a 50% improvement in battery life over conventional GPS system location techniques.

Figure 4:
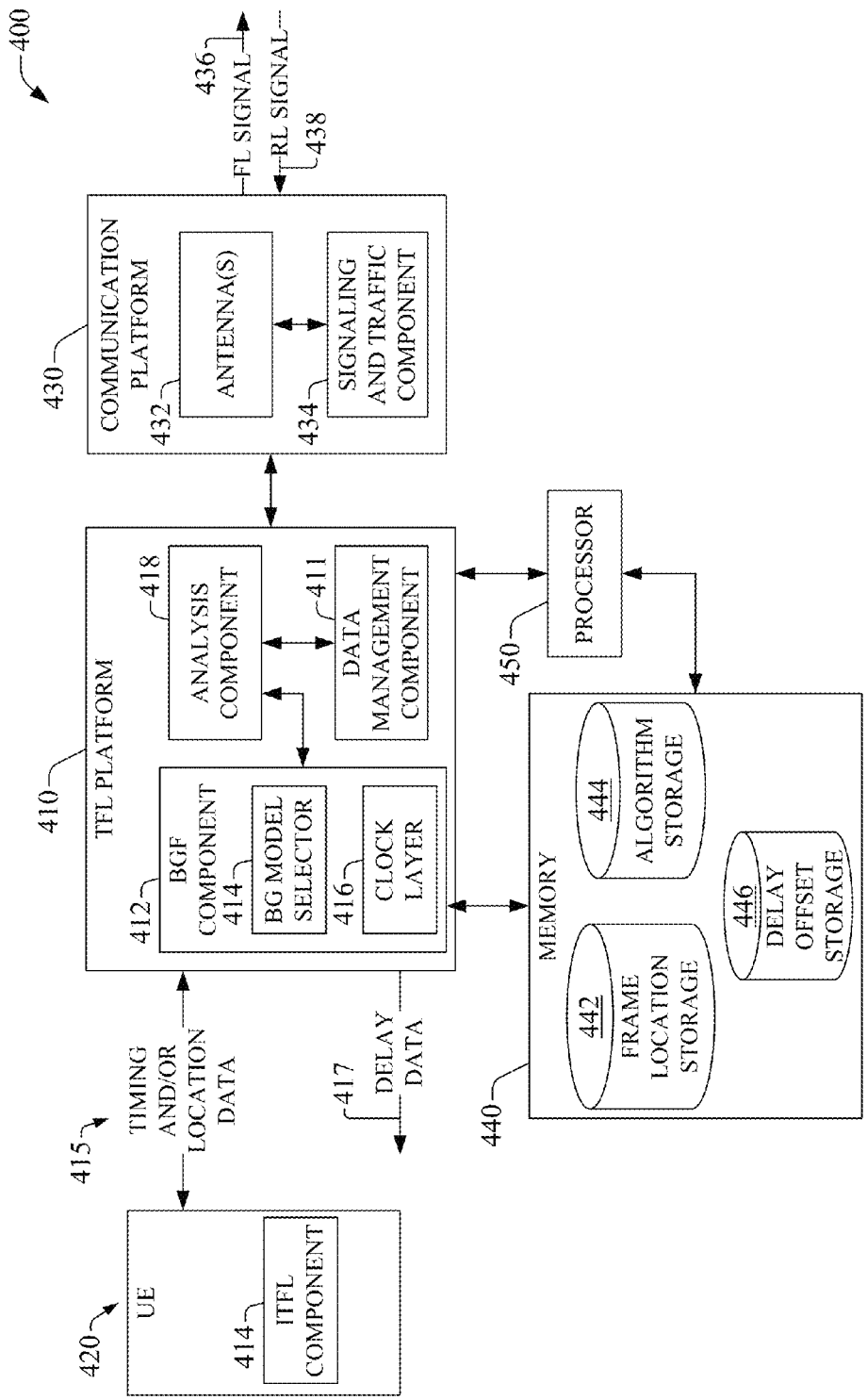
FIG. 4 is a block diagram of a system that facilitates calibration of wireless signal propagation delay in accordance with aspects described herein.

FIG. 4 illustrates a block diagram of an exemplary system 400 that facilitates time fingerprint location in accordance with aspects described herein. In an aspect, system 400 can be a part of a mobile network, and can reside at least in part within at least one of a network management component (e.g., radio network controller, core network, or network gateway) or a base station or access point. Example system 400 includes a time fingerprint location (TFL) platform 410 that facilitates location of UEs based at least in part on receiving an observed timing offset related to a frame.

Calibration platform 410 includes a bin grid framing (BGF) component 412 that can estimate the location of a mobile device or a stationary device that can communicate wirelessly. To at least that end, BGF component 412 can include a bin grid (BG) model selector 414 that selects an appropriate bin grid based at least in part on the geometry of the NBSPs interacting with the UE (not shown), e.g., selecting a particular subset of a bin grid to include frames related to NBSPs relevant to locating one or more UEs transmitting time data, select from bin grids of different granularity, selecting bin grid models related to updating frame data, etc. The model can be utilized in conjunction with observed time difference values ('C'), propagation timing values ('B'), and site timing values ('A') among forward link (FL) and reverse link (RL) wireless signals, e.g., signaling or traffic, delivered and received, respectively, by a base station or access point.

In an aspect, in example system 400, TFL platform 410 can request information (e.g., timing data, location data from a location enabled UE, etc.) from UEs through a FL wireless signal 436 that is conveyed by a signaling and traffic component 434 in a communication platform 430, which can be a part of a serving access point or NodeB. System 400 can access the requested information for UEs on a RL wireless signal 438, in the RL counterpart transport channel. It should be appreciated that communication platform 430 includes antenna(s) 432.

As described above, BGF component 412 can estimate location of a mobile device by at least in part searching computed location data sets for NBSPs and timing data that correlates to the computed values. The clock layer 416 can facilitate determining the propagation delay ('B'), for example from accessing an observed time difference ('C'). It is noted that such returned timing data is typically part of basic, conventional UE RAN operation, and no additional equipment is necessary to generate such data in most cases. Where such equipment is needed, it can be included and should be considered within the scope of the presently disclosed subject matter. Returned timing data in conjunction with bin grid frameworks provide a location estimate. TFL platform 410 also includes analysis component 418 that can implement various algorithms, stored in algorithm storage 444, to characterize or evaluate various features of the returned location data, location estimates, etc., generated by BGF component 412. In an aspect, algorithms employed by analysis component 418 include statistical analysis methodologies; other analysis methodologies such as spectral analysis and time-series analysis also can be utilized. Location data can be cached in frame location storage 432. Frame location storage can be communicatively coupled to other data storage locations (not illustrated), either locally or remotely, to facilitate sharing and updating of the frame location information.

In an aspect, system 400 can facilitate compensation of wireless signal (e.g., RF, microwave, infrared . . . ) timing variations, or correction of wireless signal propagation information by way of TFL platform 410. TFL platform 410 can access location and time data from location aware UE (e.g., as part of UE 420) and time data from non-location aware UE (e.g., as part of UE 420). This timing and/or location data can be made available to data management component 411. Accessed location and/or timing data 415 can be retained in frame location storage 442 as raw data, processed data, data converted into frame data, etc. It should be appreciated that based upon specific aspects of the UEs 220, TFL platform 410 can access location and/or timing data 415 over an air-interface by way of communication platform 430, or through a network management component such as a network server, a radio network controller, or a network gateway. UE 420 can provide location and/or timing data based, at least in part, on GNSS, such as assisted GPS, and network planning information. In an aspect, the UEs 420 comprise a set of mobile devices that, at least in part, support GNSS data reception and manipulation thereof. For example, these UEs can communicate with a GNSS system (e.g., GPS, Galileo, GLONASS . . . ) through a deep-space link. These UEs can receive timing signaling that allows determination, at least in part, of accurate position of each UE that receives sufficient information (e.g., timing information from three or more satellites) for triangulation. Alternatively, UEs can receive assisted timing information from mobile network platform(s), through base stations serving a relevant sector, mobile network platform(s) received timing information from GNSS through deep-space links, etc. Such timing information or location information can be received at various time instants and aggregated at TFL platform 410 through analysis component 418. Aggregation collects location and timing data received at various instants in time in order to augment the statistical significance of data and analysis thereof, which can improve accuracy of extracted location determinations and related propagation delay data.

Moreover, UE 420 can include individual TFL (ITFL) component 422 to facilitate individual UE determination of TFL-type information for location determination at the UE itself. ITFL component 422 can receive calibration information, e.g., by way of TFL platform 410. ITFL component 422 can then locally determine DV(?,X) values for a relevant local bin grid array associated with the UE itself. The determined DV(?,X) values can be employed to locally determine UE location information, e.g., by TFL-type techniques disclosed herein including employing a UE OV value as a lookup into the determined DV values for two or more radio pairs (NBSPs). ITFL 422 can operate in parallel with TFL platform 410 and, as such, a UE can both locally determine the location of the UE, by way of ITFL component 422, and can also request TFL location information from the wireless network by way of TFL platform 410. It can be expected that the location information, e.g., the local and the network determined locations, should be similar or the same.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

Figure 5:
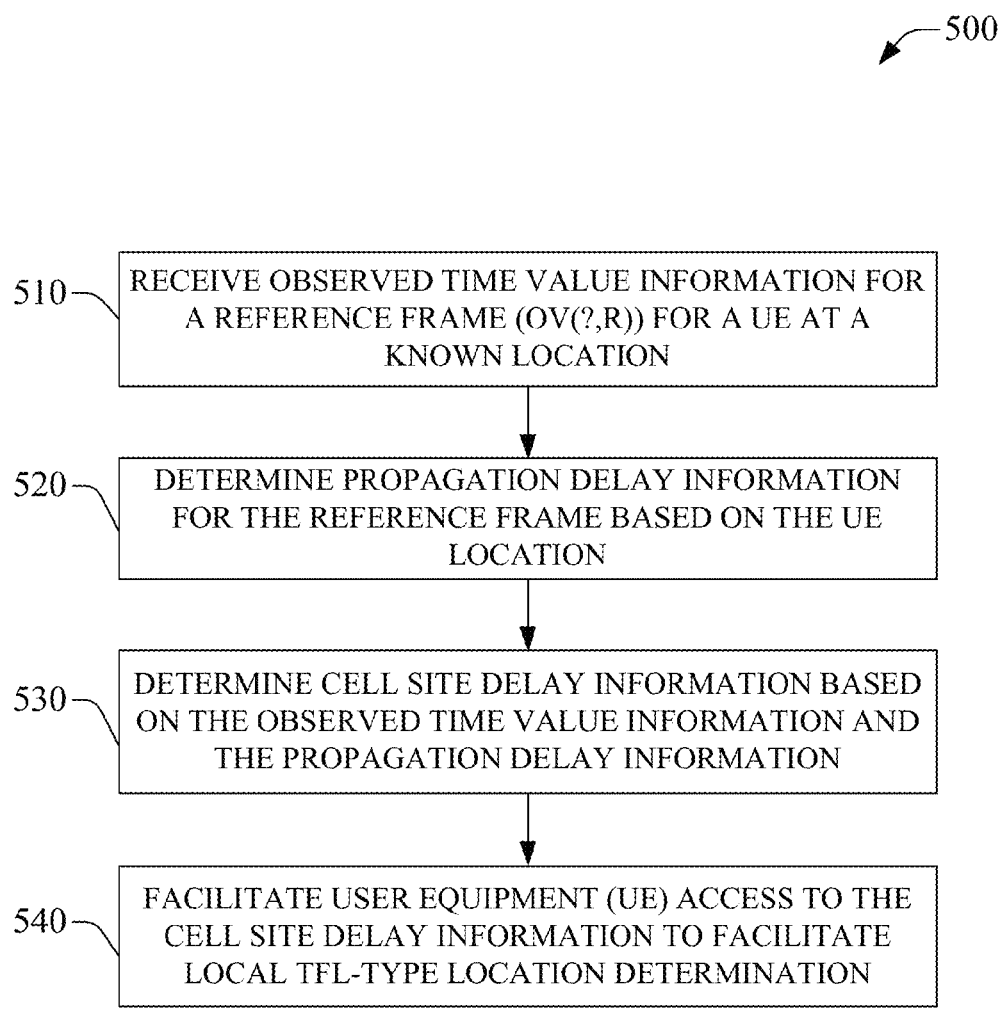
FIG. 5 illustrates a method facilitating access to calibration information in accordance with aspects of the disclosed subject matter.

FIG. 5 depicts a method 500 facilitating access to calibration information in accordance with aspects of the disclosed subject matter. As disclosed hereinabove, radio link calibration information can be leveraged at a UE to locally determine location information. Where an observed time value for a radio link to a UE can be determined, for a UE at a known location, this information can be employed to determine propagation time and cell site delay time. Cell site delay time can be employed to determine predicted observed times for radio links with UEs at one or more frames of a related bin grid frame array. As such, future observed time information can be employed to lookup a set of bin grid array frames that represent likely locations of a UE.

Location determination can facilitate correcting RF propagation delay information in an operational wireless system according to aspects described herein. Further, location information can be leveraged to provide location-centric information and services to users associated with UEs, for example, maps, events, sales, or social networking services, etc. Location-centric information and services can also be employed to provide additional services and products by way of aggregation of location information, for example, traffic data, usage data, or demographic data, among others. Still further, certain location dependent services can leverage location determinations of UEs, for example, E911.

At 510, observed time value information can be received for a UE. The UE can have a known location. The known location can be correlated to a frame of a bin grid array as disclosed herein. In an aspect, the frame of the bin grid array can be a reference frame such that the revived observed time value information can be an OV(?,R), as disclosed hereinabove.

At 520, propagation delay information can be determined for the reference frame based on the known UE location. In an aspect, where the location of the UE is known, the distance from a radio pair can be determined based on basic geometry as disclosed hereinabove. Given the determined distance from the radio pair, the propagation delay can be determined, e.g., the distance divided by the speed of light can yield a time for the radio signal to propagate the determined distance. This determined time can be termed propagation delay as it relates to the ideal time that a radio signal would need to propagate over the distance between a radio and the UE.

At 530, cell site delay information can be determined. The cell site delay information can be determined based on the observed time information from 510 and the determined propagation delay from 520. In an aspect, the cell site delay information can represent the difference between the observed time value information and the determined propagation delay. Cell site delay time can be stable for hours to days in modern wireless radio equipment and can represent a consistent temporal offset associated with the radio link. As such, the cell site delay information can be employed as calibration information. As an example, if cell site delay information is determined for a radio in the morning, it is likely that they cell site delay will be similar in the early afternoon. Continuing the example, an observed time measurement in the afternoon can therefore provide propagation delay, e.g., by subtracting the cell site delay that was measured in the morning. The exemplary propagation delay can be used to determine a distance. The distance can then be used to determine a location of the UE.

At 540, the cell site delay information can be made available to a UE of a wireless network. At this point, method 500 can end. The cell site delay information can be employed by the UE to facilitate determining a location of the UE. The determination can be made based on TFL-type location determination techniques as disclosed herein as well as in U.S. patent application Ser. No. 12/712,424.

In an embodiment, method 500 can be employed on carrier-side equipment as part of a TFL component, e.g., TFL platform 410, etc. Carrier-side embodiments can be associated with larger areas of a wireless network, although they are explicitly not so limited. In a further embodiment, method 500 can be employed on a UE in a similar manner. For a UE deployment of method 500, the deployment can be associated with radios that are communicatively coupled to the UE, although they are explicitly not so limited. In an aspect, where a wireless carrier includes TFL-enabled equipment in the wireless network, calibration information is typically determined as part of the carrier-side TFL-enabled systems and methods and it can be redundant to also determine calibration information at a UE. As such, a carrier can allow dissemination of calibration information, e.g., by inclusion in overhead channels to UEs. As an example, a radio at a NodeB can be associated with cell site delay information. The radio can transmit the associated cell site delay information. UEs can receive the cell site delay information and can employ it to facilitate determining differential time value information and also to facilitate determining location information for the UE. Where the UE determines its own differential time value information and/or its own location information based on the calibration information, the UE can do so without the energy expense of using a GPS or requesting TFL information from a carrier-side system. Further, individual UE determination of location information base don't eh calibration information can be performed faster than relying on over the air protocols and can be more private than requesting that the carrier determine a TFL location for the UE and transmit it back to the UE.

Figure 6:
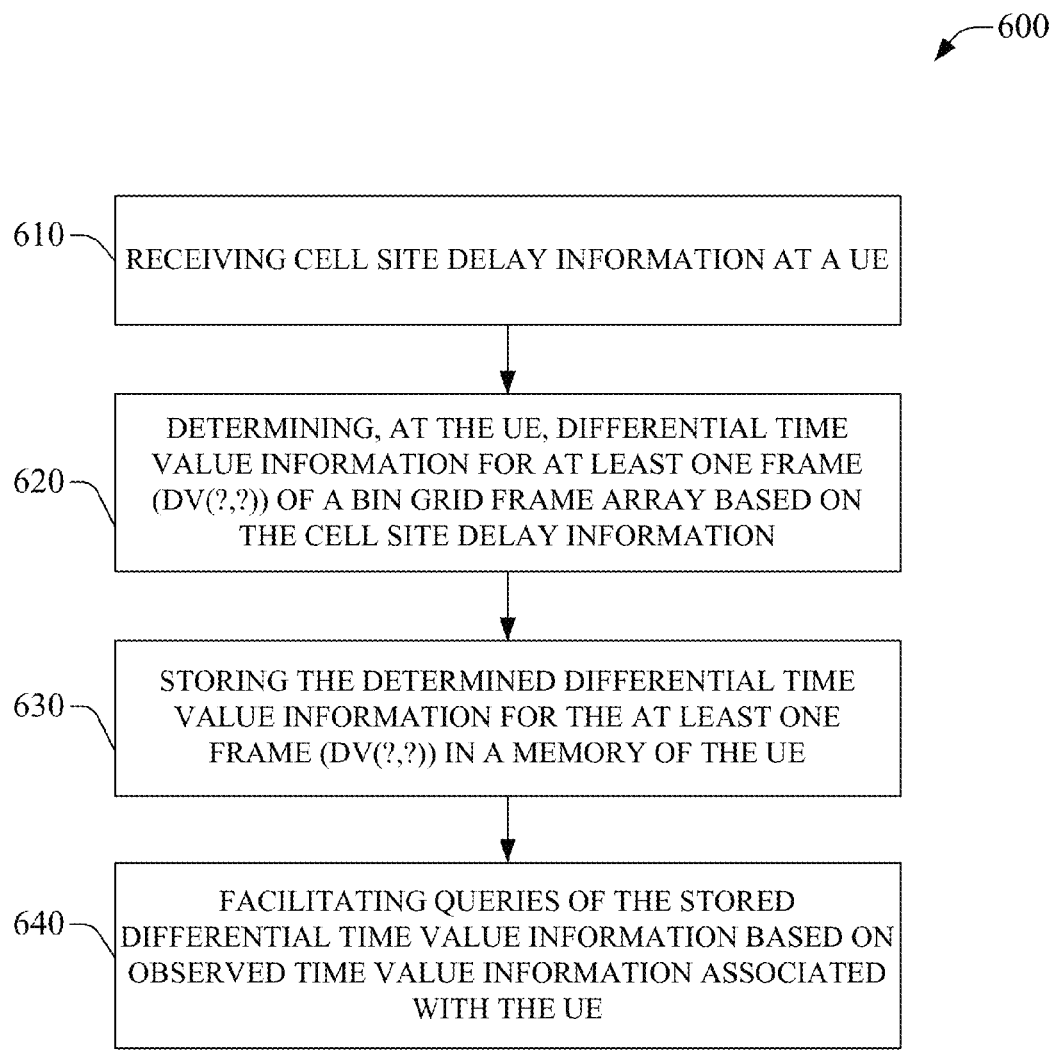
FIG. 6 presents a flowchart of a method for determining differential time value information for a UE-localized bin grid frame array in accordance with aspects of the disclosed subject matter.

FIG. 6 presents a flowchart of a method 600 for determining differential time value information for a UE-localized bin grid frame array in accordance with aspects of the disclosed subject matter. At 610, cell site delay information can be received at a UE. In an embodiment, cell site delay information, e.g., calibration information, can be determined at carrier-side systems and be made available to UEs on the carrier's wireless network. In an aspect, a UE can selectively receive cell site delay information for relevant radios. As an example, relevant radios can be radios of the wireless network that are visible to the UE. As another example, relevant radios can be radios of the wireless network that are visible to the UE and meet a threshold signal strength. Numerous other criteria can be employed to designate relevant radios, all such criteria are within the scope of the present disclosure and are not enumerated for clarity and brevity.

At 620, differential time value information can be determined at the UE. The differential time information can be for at least one frame of a bin grid frame array and can be based on the cell site delay information. In an aspect, given the known positions of radios, e.g., NodeBs, the propagation delay can be geometrically determined to the frames of a bin grid frame array. The propagation delay and the cell site delay can be summed to yield a predicted observed time value.

In an embodiment, an OV(?,?) value can be determined. The determined OV(?,?) value can be based, at least in part, on a time difference between a radio pair in the wireless network and the UE. In an aspect, an OV(?,R) can be determined by solving Eq. 1 where DV(?,R) and DV(?,X) can be determined based on the geographical location of a reference frame R and an instant frame X from the relevant NBSP radios, and where the received time difference is OV(?,X). Further, as described herein, in an aspect, where a location aware UE is available to provide data for the reference frame R, OV(?,R) can be calculated directly as equivalent to the OV(?,X) because X=R under these conditions. As such, a device can employ GPS systems occasionally to keep the bin grid frame array populated with relevant information, then switch to individual TFL (ITFL) location information techniques and/or systems to conserve battery life, etc. DV(?,?) values can be rapidly calculated and employed in translating OV(?,X) values into OV(?,R) values. Additionally, location determinations can be accumulated, weighted, and/or otherwise statistically manipulated to provide improvements to the resulting value, for example, averaging over a plurality of OV(?,R) can be employed to reduce certain types of error propagation.

A differential value DV(?,?) can be determined for frames of a bin grid framework and for NBSPs of relevance. Given that NBSP (e.g., first and second NodeB radio) locations are typically well defined physical locations, the differential value, DV(?,?), can be geometrically determined (measured in chips) because the geographic location of each frame is defined by the bin grid framework in relation to each relevant NBSP. The bin grid can be local to the UE. In an aspect, a local UE bin grid can include a portion of a larger wireless radio network. Further, the local UE bin grid can be expected to change as the UE changes position as part of regular use. As an example, a UE bin grid can cover a region of 100 chip radius around the UE. Further, a NBSP can be associated with a limited set of specific frames for which the NBSP is relevant. For example, a NBSP located in San Diego, Calif. would not be relevant to bin grid frames in Redding, Calif. Thus, the relevant frames can be limited to those of significant value to any specific NBSP and within the locus of control of the UE. As a non-limiting example, each NBSP can be limited to an arbitrary number of the closest frames, for example, 4096 frames and within a set distance of the UE such as within 100 chip. This can serve to reduce data that would otherwise be of little value.

At 630, the determined differential time value information for the at least one frame (DV(?,?)) can be stored in a memory of the UE. Storing the determined differential time value information local to the UE can facilitate rapid access to the information, improved energy consumption for location determination, and improved location determination privacy. A database of bin grid frame locations can be updated with DV(?,?) values for each relevant NBSP. These values can be an index through the data. These indexes can be employed to find relevant frame locations, for example, by using an SQL-type query on the indexed data. Where large volumes of data are developed for local UE bin grid frame arrays, these datasets can be indexed for fast searching and can be stored in subsets for particular areas or NBSPs.

In an aspect, statistical analysis of the data, e.g., frame locations and DV(?,?) index values are utilized to establish a correlation between propagation values for multiple NBSPs (e.g., a differential locations) to facilitate structured data analysis that returns a match or limited set of potential matches for a UE location. These location values can be converted into propagation times because of the measurements are in chips. This can allow for correction and compensation of wireless network timing values as well as allowing for location-centric services and information aggregation. It will be noted that statistical metrics can also be employed to quantify a correlation among location data information, particularly in aggregated location data applications.

At 640, queries of the stored differential time value information can be facilitated. These queries can be based on observed time value information associated with the UE. At this point method 600 can end. In an aspect, the UE can receive calibration information, locally determine bin grid values, and then locally query the bin grid values to determine location based on determined observed time values. A differential value, DV(?,X), for a frame X can be determined. For example, Eq. 3 can be employed to determine DV(?,X) for a given OV(?,X) where DV(?,R) and OV(?,R) have already been determined. A frame location set can be found and returned from the database based, at least in part, on DV(?,X) and the relevant NBSP as indexes. As a non-limiting example, for any given NBSP and index DV(?,X) value, 150 frames with matching DV(?,?) values can be returned. This indicates that the UE with the DV(?,X) value is likely located in one of the 150 frames returned. These frames typically correspond to a hyperbola between the NodeB radios of the indicated NBSP. One advantage is that the index values for the frames are pre-computed and complex math is not required at lookup to get the resulting set as would be required in a traditional multilateration technique. The value of the pre-computation and lookup aspect of the disclosed subject matter becomes significantly more prominent when numerous NBSPs are searched for the same DV(?,X) value. The increase in complexity for traditional multilateration techniques is factorial and quickly becomes computationally intensive. In contrast, the lookup technique remains comparatively computationally simple, even over large sets of data. As an example, a relevant set of NBSP frame locations for a given DV(?,X) value is likely to intercept another frame location set for a different relevant NBSP in a limited number of frame locations. This can rapidly result in convergence on a singular frame location of the two or more sets without the need for any complex math at the time of lookup. It is noted that the subject example method 600 can be similar to aspects employed for location of UE in a carrier-side TFL wireless network.

Figure 7:
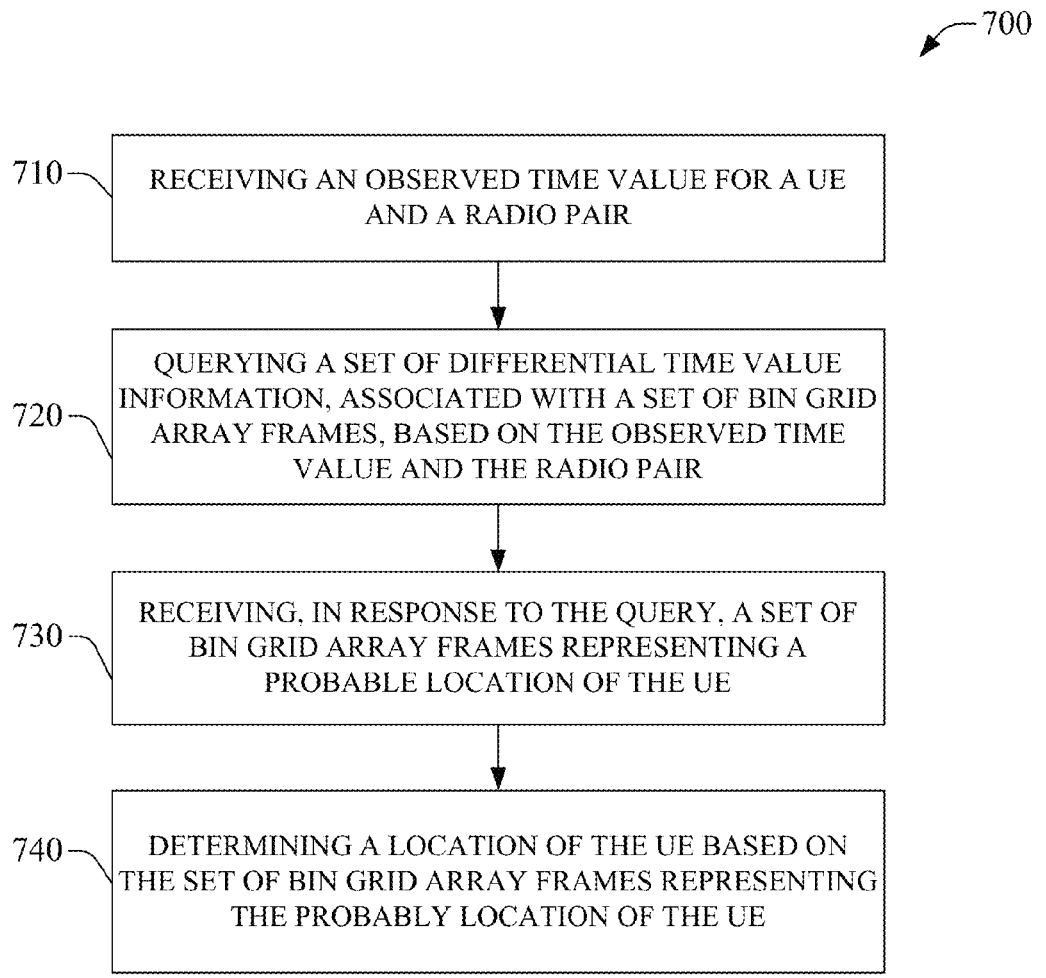
FIG. 7 depicts a method facilitating determining a location of a UE in accordance with aspects of the disclosed subject matter.

FIG. 7 depicts a method 700 facilitating determining a location of a UE in accordance with aspects of the disclosed subject matter. At 710, an observed time value for a UE and a radio pair can be received. This value can be employed as part of a query of predetermined differential time values for a bin grid frame array. At 720, a set of differential time value information associated with a set of bin grid array frames can be queried. The query can be based on the observed time value and radio pair information from 710.

At 730, a response to the query of 720 can be received. The response can include a set of bin grid array frames that represent a probable location of the UE. In an aspect, the set can typically correspond to a hyperbola between the radio pair. In a further aspect, the query can return a plurality of sets for a plurality of radio pairs. At 740, a location of the UE can be determined based on the set of bin grid array frames from 730. At this point method 700 can end. In an embodiment, the intersection of two or more sets of query results can converge on a probable location of the UE.

In an aspect, method 700 can describe employing observed time values to lookup probably locations of a UE employing a local set of differential time values for a bin grid frame array. As such, method 700 can be much faster than sending a query over the air to a carrier-side TFL system and then receiving, over the air, a location from the carrier-side TFL system. Further, the location can be determined locally and provide better privacy than requests for TFL information form carrier-side systems. Moreover, the local determination of UE location by method 700 can be done without use of power hungry GPS or AGPS systems.

Figure 8:
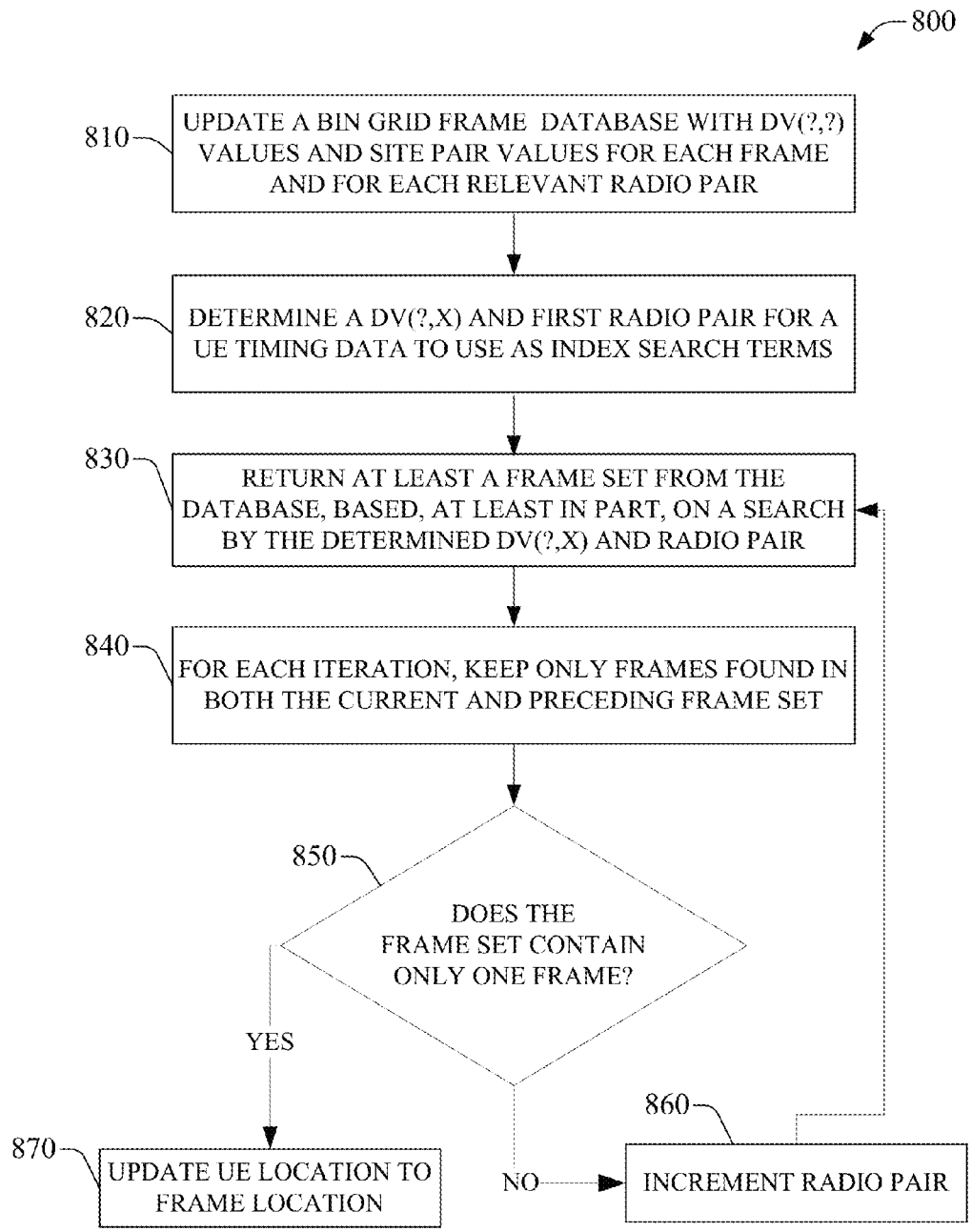
FIG. 8 is a flowchart of an exemplary method for iteratively determining a location of a UE according to aspects of the disclosed subject matter.

FIG. 8 is a flowchart of an exemplary method 800 for iteratively determining a location of a UE according to aspects of the disclosed subject matter. The subject example method 800 can be implemented by one or more network components, e.g., TFL platform 410, and/or one or more local components, e.g., ITFL component 422. Alternatively or additionally, a processor (e.g., processor 450) configured to confer, and that confers, at least in part, functionality to the one or more network components can enact the subject example method 800.

At 810, a database of frame locations can be updated with differential location values and NBSP identification values. Updating the DV(?,?) indices and the NBSP indices for frame location keeps the dataset well maintained over time as values can drift and NBSPs can change as sites are commissioned, decommissioned, taken down for service, or return from service, for example. Where a NodeB, for example, unexpectedly goes offline, all existing DV(?,?) values for NBSPs including the offline NodeB will be immediately invalid. Hence, updates to the database records to, for example, remove NBSPs attached to the offline NodeB will help to keep location lookups in that region relevant and accurate.

At 820, a differential location value for a UE can be determined. This can be calculated from the time data transmitted by the UE by way of Eq. 3 where the remaining values are known. Further, a first NBSP can be determined as a database index term. For example, signal values can indicate the closest NBSPs from which the most relevant set can be selected as a first index. Other examples of selecting relevant NBSPs can include selecting sites that have statistically reliable data associated with them, selecting pairs that are related to a general direction of travel, availability of look-up resources at various network components, etc.

At 830, a set of frame locations is returned from the database search of the selected NBSP and DV(?,X) value searched. As disclosed herein, this set can include zero, one, many, or all frame locations. As a non-limiting example, a search can return 150 frame locations in the frame location set.

At 840, for each iteration, only frames in both the current and previous set are retained. Whereas it is the first iteration, all frames in the set are kept.

At 850, a determination is made based on the number of frame locations in the frame location set. Where there is more than one frame in the frame location set, the method passes to 860. Where there is only one frame in the set, the method 800 proceeds to 870.

At 860, the NBSP is incremented and the method 800 returns to 830. Upon the return to 830, the DV(?,X) value is searched again but his time indexed with the next relevant NBSP. The method at 830 returns a new frame location set and proceeds to 840. At 840 for the second iteration, the frames of the new set and the preceding set are compared and frames found in both sets are retained in the frame set, such that upon subsequent iterations, this retained set is compared to subsequent new frame location sets and a single value will be converged on iteratively. At 850, a determination is again made relating to the number of frame locations in the frame location set. This process continues until a single frame location is present in the frame location set. One of skill in the art will appreciate that non-convergent behavior is not discusses herein, but that such behavior is within the scope of the disclosure. For example, where the behavior is non-convergent, the method can end without satisfying the decision at 850.

At 870, the sole remaining frame location is equated to the location of the UE and the UE location is updated to reflect this determination. At this point method 800 can end.

Figure 9:
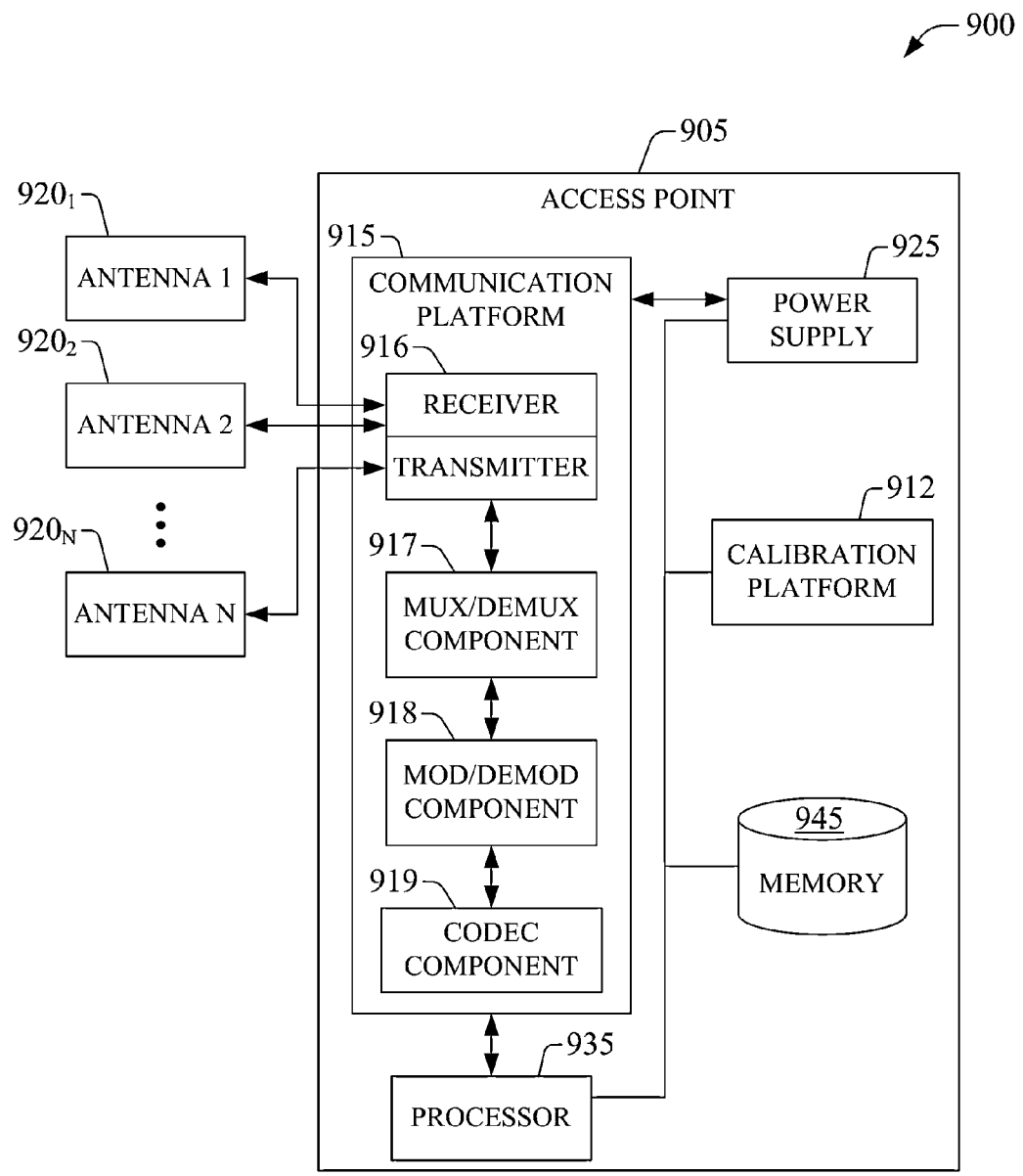
FIG. 9 illustrates a block diagram of an exemplary embodiment of an access point to implement and exploit one or more features or aspects of the disclosed subject matter.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 970; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 960 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 960, or SS7 network 970. In an aspect, memory 930 can be, for example, accessed as part of a data store component or as a remotely connected memory store.

Figure 10:
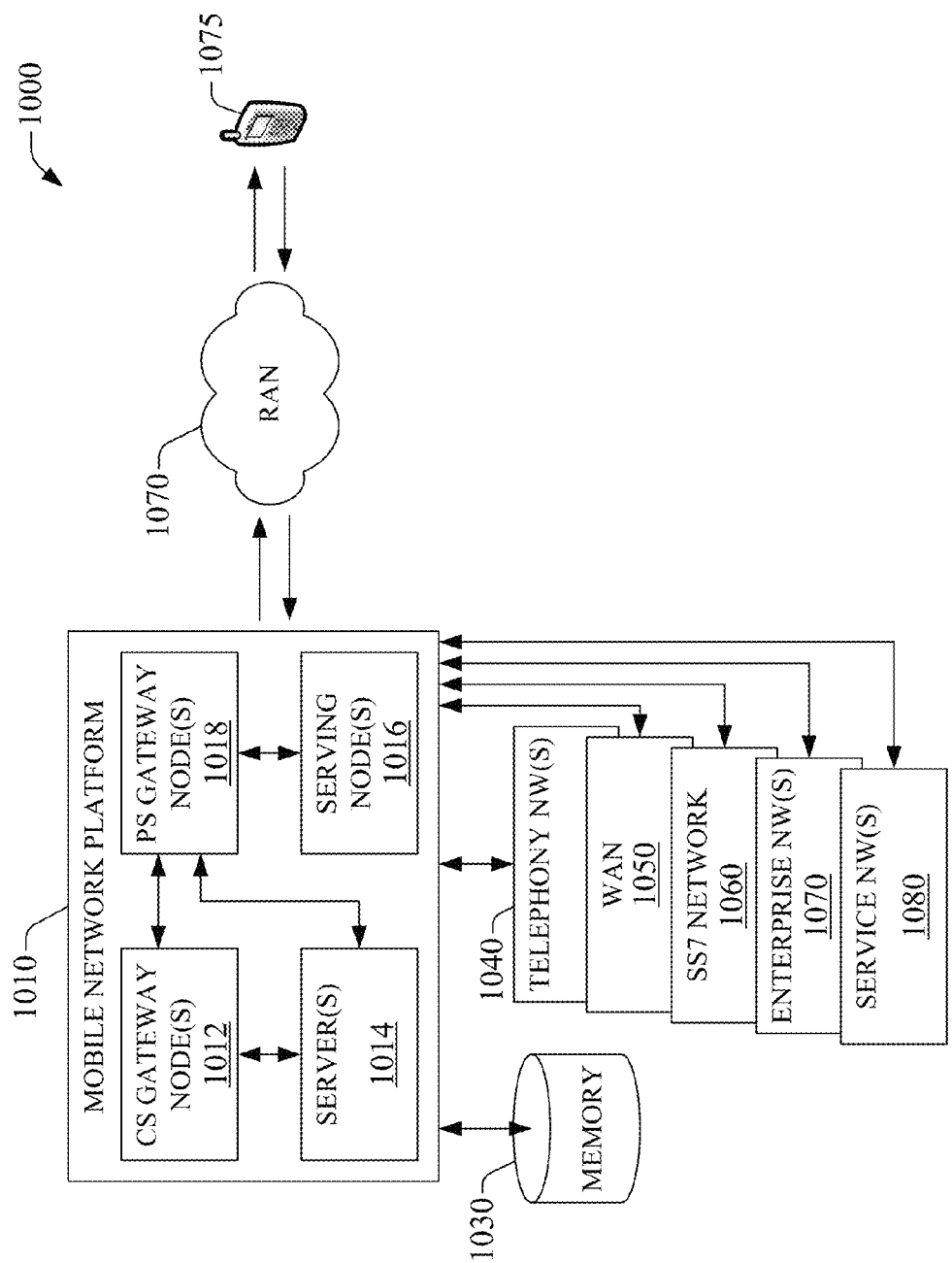
FIG. 10 is a block diagram of an exemplary embodiment of a mobile network platform to implement and exploit various features or aspects of the disclosed subject matter.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc., that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of an ITFL component e.g., ITFL component 422, etc., a user equipment, e.g., UE 260, 262, 264, 266, 420, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "radio," "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," "carrier network," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A mobile device, comprising:
   at least one memory that stores computer-executable instructions; and
   at least one processor, communicatively coupled to the at least one memory, that facilitates execution of the computer-executable instructions to at least:
   determine differential time value information for at least one frame of a bin grid frame array based on cell site delay information; and
   store the determined differential time value information in the at least one memory to facilitate queries of the determined differential time value information based on observed time value information associated with the mobile device.

2. The mobile device of claim 1, wherein a geographic area represented by the bin grid frame array is based on a criterion associated with the mobile device.

3. The mobile device of claim 2, wherein the criterion is a distance from the mobile device.

4. The mobile device of claim 2, wherein the criterion is a location of a radio having a radio connection status representative of the radio being in contact with the mobile device and the radio is included in a base station.

5. The mobile device of claim 1, wherein the cell site delay information is received from a carrier-side timed fingerprint location system.

6. The mobile device of claim 1, wherein the cell site delay information is received from a user equipment-side timed fingerprint location system.

7. The mobile device of claim 1, wherein the at least one processor further facilitates the execution of the computer-executable instructions to at least:
   query the stored differential time value information based on the observed time value information associated with the mobile device; and
   receive, in response to the query, a set of frames of the bin grid frame array.

8. The mobile device of claim 7, wherein the set of frames represents a set of probable locations of the mobile device.

9. The mobile device of claim 7, wherein the at least one processor further facilitates the execution of the computer-executable instructions to at least determine a location of the mobile device based on the set of frames.

10. The mobile device of claim 9, wherein the location of the mobile device is based on a subset of frames determined by the intersection of the set of frames and a second set of frames associated with a second query of the stored differential time value information based on second observed time value information associated with the mobile device different from the observed time value information.

11. A method, comprising:
    determining, by a system including a processor, differential time value information for at least one frame of a bin grid frame array based on cell site delay information; and
    storing, by the system, in at least one memory of a mobile device, the differential time value information to facilitate a query of the differential time value information based on observed time value information associated with the mobile device.

12. The method of claim 11, wherein determining the differential time value information includes determining, by the system, a geographic area represented by the bin grid frame array based on a criterion associated with the mobile device.

13. The method of claim 12, wherein determining the differential time value information includes determining the geographic area represented by the bin grid frame array based on a distance from the mobile device.

14. The method of claim 12, wherein determining the differential time value information includes determining the geographic area represented by the bin grid frame array based on a location of a radio having a radio connection status representative of the radio being in contact with the mobile device.

15. The method of claim 11, wherein determining the differential time value information includes determining the differential time value information based on cell site delay information determined from carrier-side timed fingerprint location information.

16. The method of claim 11, further comprising:
receiving, by the system in response to the query of the stored differential time value information, a set of frames of the bin grid frame array.

17. The method of claim 16, wherein the receiving the set of frames includes receiving the set of frames representing a set of probable locations of the mobile device.

18. The method of claim 16, further comprising:
determining, by the system, a location of the mobile device based on the set of frames.

19. A non-transitory computer-readable storage medium storing computer-executable instructions that, in response to execution, cause a system including a processor to perform operations, comprising:
determining differential time value information for at least one frame of a bin grid frame array based on cell site delay information; and
facilitating storage, in at least one memory of a mobile device, of the differential time value information to facilitate a query of the differential time value information based on observed time value information associated with the mobile device.

20. The non-transitory computer-readable storage medium of claim 19, wherein the operations further comprise:
receiving, in response to the query of the stored differential time value information, a set of frames of the bin grid frame array; and
determining a location of the mobile device based on the set of frames.

* * * * *